Oct. 13, 1942.  W. R. HUTCHISON, JR., ET AL  2,298,382
CAMERA SHUTTER SPEED CONTROLLER AND SWITCH
Filed April 6, 1940
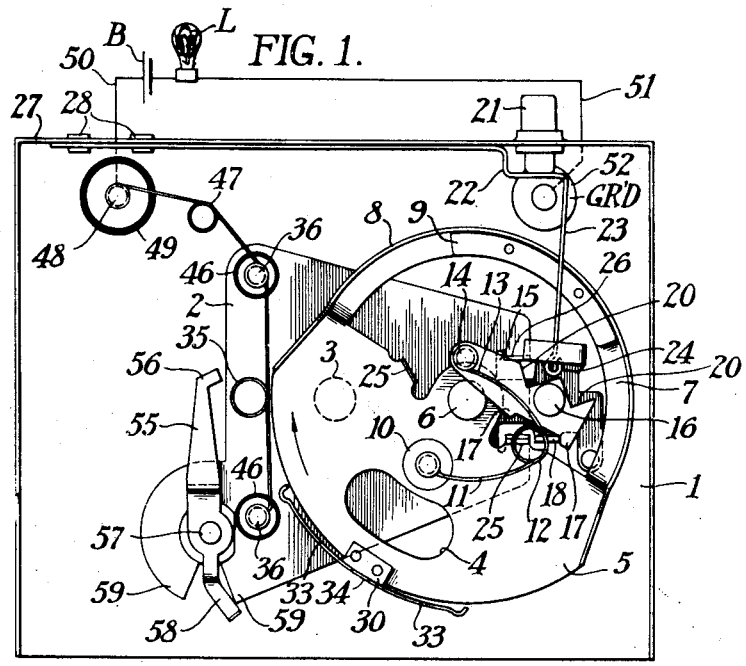
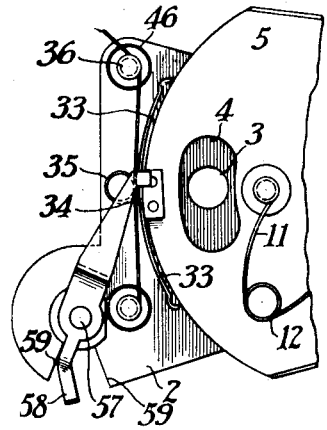
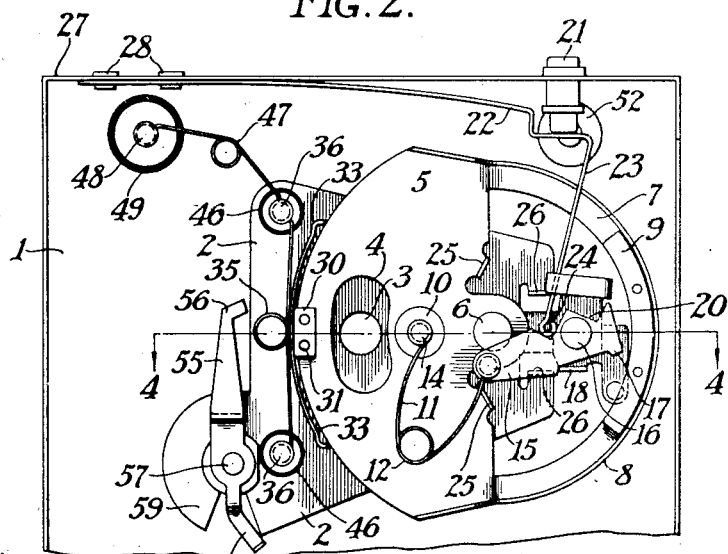
MILLER R. HUTCHISON, JR.
ALOIS L. WEHR
INVENTORS
BY
ATTORNEYS Patented Oct. 13, 1942

2,298,382

UNITED STATES PATENT OFFICE 2,298,382

CAMERA SHUTTER SPEED CONTROLLER AND SWITCH

Miller R. Hutchison, Jr., and Alois L. Wehr, Rochester, N. Y., assignors to Eastman Kodak Company, Rochester, N. Y., a corporation of New Jersey Application April 6, 1940, Serial No. 328,314

6 Claims. (Cl. 95—61)

This invention relates to photography and more particularly to shutters for photographic cameras.

One object of our invention is to provide a camera shutter with a means for controlling the speed of operation of the shutter and to provide a factory adjustment for adjusting the speed when the shutter is being assembled. Another object of our invention is to provide a shutter of the type moving in one direction to make one exposure and in a reverse direction to make the next exposure, and to provide a factory adjustment for regulating the speed of exposure in each direction. Still another object of our invention is to provide a shutter speed controlling device which may also be used as a switch for making a flashlight circuit. Still other objects will appear from the following specifications, the novel features being particularly pointed out in the claims at the end thereof.

Coming now to the drawing wherein like reference characters denote like parts throughout:

Fig. 1 is a front elevation showing a camera shutter removed from the camera, the parts being constructed in accordance with and embodying a preferred form of our invention and having a flashlight circuit shown diagrammatically.

Fig. 2 is a fragmentary view showing a front elevation of the shutter parts some of which are in a different position from the showing of Fig. 1, the flashlight circuit being omitted.

Fig. 3 is a fragmentary front elevation of some of the shutter parts shown in a position for a prolonged exposure such as a "time" exposure.

Fig. 4 is an enlarged fragmentary sectional view taken on line 4—4 of Fig. 2.

In inexpensive cameras and particularly inexpensive box cameras it is usually difficult to obtain a shutter which will make an exposure of the same duration regardless of the position in which the camera is held while the exposure is being made. It is still more difficult to construct a two-way shutter—that is a shutter which moves in one direction for making one exposure and in a reverse direction for making another exposure—in which the exposures made by the shutter in both directions are identical, regardless of the position in which the camera may be held while making the exposures.

Our present application is primarily directed to a construction with which reasonably accurate factory adjustments may be made so that shutters will not only produce exposures of the desired length, but the exposures will be uniform regardless of the direction in which the shutter is moved to make an exposure, and regardless of the position in which the camera is held.

Referring to Fig. 1, which illustrates a simple shutter constructed in accordance with our invention and which shows a shutter of an inexpensive type, the shutter parts are mounted on a support 1 which carries a plate 2. This plate is apertured at 3 so that when an exposure slot or opening 4 in a shutter blade 5 swings past the opening 3, an exposure will be made.

The shutter blade 5 is mounted upon a stud 6 carried by this support on which the blade may freely turn, and I prefer to provide an extension 7 on the shutter blade 5, which in this instance is of arcuate shape and which may be flanged at 8 to carry a counter-weight 9. Thus the weight of the shutter blade 5 is distributed evenly about the stud 6, and the blade 5 will turn freely regardless of the position in which the camera is held making an exposure.

The shutter blade 5 is provided with an upstanding pin 10 carrying one end 11 of a hairpin spring 12, the other end of which, 13, is carried by a stud 14 mounted on the switch member 15, pivoted at 16 to the plate 2 and having a pair of spaced shoulders 17 positioned to alternately engage an upstanding lug 18 forming a stop limiting the movement of the switch member 15.

The switch member 15 is equiped with a double cam resembling two V-shaped notches 20 so that when a trigger member 21 is depressed, moving a substantially L-shaped spring member 22, a downwardly extended arm 23 terminated in a knob 24 may slidably engage one of the cam faces 20 to move the switch member.

The switch member 15 is movable upon its stud 16 from the position shown in Fig. 1 to the position shown in Fig. 2. This movement, by moving the end 13 of the hairpin spring 12 past a dead center with reference to pin 10, causes the hairpin spring to exert a sudden pressure upon the shutter blade 5, thus swinging it about its pivot 6 causing the slot 4 to cross the exposure aperture 3 to thereby make an exposure.

The possible movement of the shutter blade 5 is limited by a pair of lugs 25 conveniently placed inside of the arcuate portion 7 and positioned to engage a pair of lugs 26 carried by the plate 2. Thus, after an exposure has been completed, one of the lugs 25 engages one of the stops 26. The necessary actuation of the trigger member 21 will therefore cause the shutter blade to move so that the opposite lug 25 will engage the opposite stop 26.

In the form of shutter illustrated, the shutter blade 5 moves in one direction to make one exposure and in the opposite direction to make the other exposure, this type of shutter being illustrated because it is the more difficult type of shutter to accurately control the speeds of exposure. Obviously our invention may also be applied to other types of shutters.

The substantially L-shaped spring member 22 may be attached to an upstanding flange 27 by means of rivets 28 so that this member will flex from the position shown in Fig. 1 to the position shown in Fig. 2 when the trigger member 21 is moved.

The primary feature of our invention is to provide a means for controlling the speed of exposure. This is done by controlling the speed of rotation of the blade 5 about its stud 6 in the following manner. The shutter blade 5 is provided with a bracket 30 which may be attached to the shutter blade by rivets 31 if desired, and which includes an upstanding center portion 32 having a pair of spaced bendable arms 33 extending in each direction from the center support 32 which is continued upwardly at 34 to form a time stop as will be hereinafter more fully described.

It will be noticed that the outwardly extending arms 33 are substantially concentric with the stud 6 on which the shutter blade 5 may swing, and we have provided a hairpin spring member 35 carried by a pair of supporting studs 36 in a position substantially tangent to the periphery of the shutter. It is possible to use other types of spring members 35 but the advantage of using a so-called hair-spring type is that this type of spring is quite flexible and can readily be made to offer comparatively little resistance to the wiping action of the arms 33 which occurs when the shutter blade 5 swings upon its supporting stud 6.

The length of the arms 33 is such that they may engage the spring 35 slightly before or at the time that the edge of the shutter slot 4 begins to uncover the exposure aperture 3. Thus, by bending the arm 33 it approaches the spring 35 as the shutter moves in one direction so that the spring 35 is flexed more or less. The speed of the shutter blade 5 can be readily controlled and a workman in assembling the shutter can readily make this adjustment.

It will be seen from the above that when the shutter is moving in a clockwise direction, the arm which in Figs. 1 and 2 may be said to be the upper arm is the one which primarily controls the speed of the shutter because the following arm only engages the spring 35 as the shutter closes. Thus, by bending the upper spring 33, the clockwise speed of the shutter may be determined.

The counter-clockwise speed of the shutter is primarily determined by what may be termed the lower arm 33 so that after adjusting the clockwise speed of the shutter in assembling the shutter, the speed of the shutter in a counter-clockwise direction may be adjusted by bending the arm 33.

The bending movement may be rapidly accomplished by means of suitable tweezers, and since the metal of the arms is soft and not springy, it will receive a set when bent. If the speed of the shutter is too fast—and this is usually the case with inexpensive shutters of the type described—the extreme end of the arm is bent away from the stud 6 so that it will flex the spring 35 to a greater extent as the shutter rotates. The wiping action of the arm against the spring 35 slows down the operation of the shutter.

We have found that our construction has an additional advantage in that it may be used as a switch and makes a flashlight circuit. It can conveniently be used to synchronize a shutter flash with a simple type of shutter, and for this purpose we preferably mount the studs 36 upon insulated pads 46 and connect the spring 35 with a connecting wire 47, which is mounted on a terminal 48, insulated at 49 from the front plate 1.

The flash circuit is diagrammatically illustrated in Fig. 1, where it will be noted that the terminal 48 is connected to the wire 50 which is attached to one terminal of a battery B, the other terminal being connected to the front plate 1 by means of a wire 51. The flashlamp L may therefore be ignited when an arm 33 strikes the spring 35 thus making a circuit just as the slot 4 of the shutter 5 uncovers the exposure opening 3 so that the flashlamp L may reach its full illumination during the time the shutter slot 4 is crossing the exposure aperture 3.

The terminals 48 and 52 may be of any suitable type to receive jacks for the wires 50 and 51, and the lamp L and battery B may be carried in a separate attachment in the usual manner.

In order to make prolonged exposures such as time exposures we provide a time lever 55 having a hook-like end 56 which may be swung to and from the path of the upwardly extending lug 34 of the bracket 32 by moving a knob or handle (not shown) carried by the shaft 57 on the outside of the shutter plate 1 to turn the hook upon the shaft 57. The movement of the hook is limited by means of a tail 58 which strikes either one of two similar stops 59, which can be made by shaping the metal of the supporting plate 2. Fig. 3 illustrates the position of the shutter plate 5 when it has been swung to cause the slot 4 to uncover the exposure aperture 3. The duration of the exposure can be controlled by the movement of the lever 55, or a second depression of the trigger 21 may return the shutter plate 35 to the position from which it started when the trigger was first depressed. The time lever merely prevents the shutter plate 5 from making one complete movement, halting the movement of the plate with the exposure aperture 3 uncovered.

We claim:

1. A shutter mechanism for cameras comprising, in combination, a support, a shutter movably mounted on the support to move through a fixed path of movement, mechanism operably connected to the shutter for moving it through its fixed path, a spring member carried by said support adjacent the path of movement of the shutter, and a bendable arm carried by the shutter for engaging and flexing the spring member for controlling the speed thereof.

2. A shutter mechanism for cameras comprising, in combination, a support, a shutter movably mounted on the support to move through a fixed path of movement, mechanism operably connected to the shutter for moving it through its fixed path, a spring member carried by said support adjacent the path of movement of the shutter, said mechanism for driving the shutter including means for driving the shutter in two directions past the spring member, a pair of adjustable arms carried by the shutter and positioned to contact with the spring member for controlling the speed of operation of the shutter.

3. A shutter mechanism for cameras comprising, in combination, a support, a shutter movably mounted on the support to move through a fixed path of movement, mechanism operably connected to the shutter for moving it through its fixed path, a spring member carried by said support adjacent the path of movement of the shutter, said mechanism for driving the shutter including means for driving the shutter in two directions past the spring, a pair of bendable arms carried by the shutter member and positioned to be bent to flex the spring as said shutter is driven past the spring whereby the speed of the shutter may be initially adjusted by bending the arms to flex the spring to an extent necessary to obtain the desired speed.

4. A shutter mechanism for cameras comprising, in combination, a support, a shutter movably mounted on the support to move through a fixed path of movement, mechanism operably connected to the shutter for moving it through its fixed path, a spring member carried by said support adjacent the path of movement of the shutter and of a length considerably less than the path through which the shutter passes, a pair of spaced arms carried by the shutter and each positioned to contact the spring, said mechanism for driving the shutter including means for driving the shutter in two directions, and means for initially adjusting the speed of the shutter in each direction by bending an arm to flex the spring to the degree necessary to obtain the desired speed.

5. A shutter mechanism for cameras comprising, in combination, a support, a shutter pivotally mounted on an apertured support and having an aperture in the shutter adapted to register with the aperture in the support, a spring driving mechanism for driving the shutter about its pivot, a spring arranged tangentially with respect to the pivoted shutter, and an adjustable member carried by the shutter positioned to wipe across the spring for controlling the speed of the shutter through the flexing of the spring.

6. A shutter mechanism for cameras comprising, in combination, a support, a shutter pivotally mounted on an apertured support and having an aperture in the shutter adapted to register with the aperture in the support, a spring driving mechanism for driving the shutter about its pivot, a spring arranged tangentially with respect to the pivoted shutter, a pair of spaced bendable arms carried by the shutter and positioned to contact with said spring, said means for driving the shutter including means for driving the shutter in two directions, the bendable arms being positioned on the shutter so that one arm may engage the spring and control the speed of the shutter by flexing the spring when said shutter is driven in one direction and the other arm may engage and flex the spring to control the speed of the shutter when moving in an opposite direction.

MILLER R. HUTCHISON, Jr.
ALOIS L. WEHR.